United States Patent Office 3,432,318
Patented Mar. 11, 1969

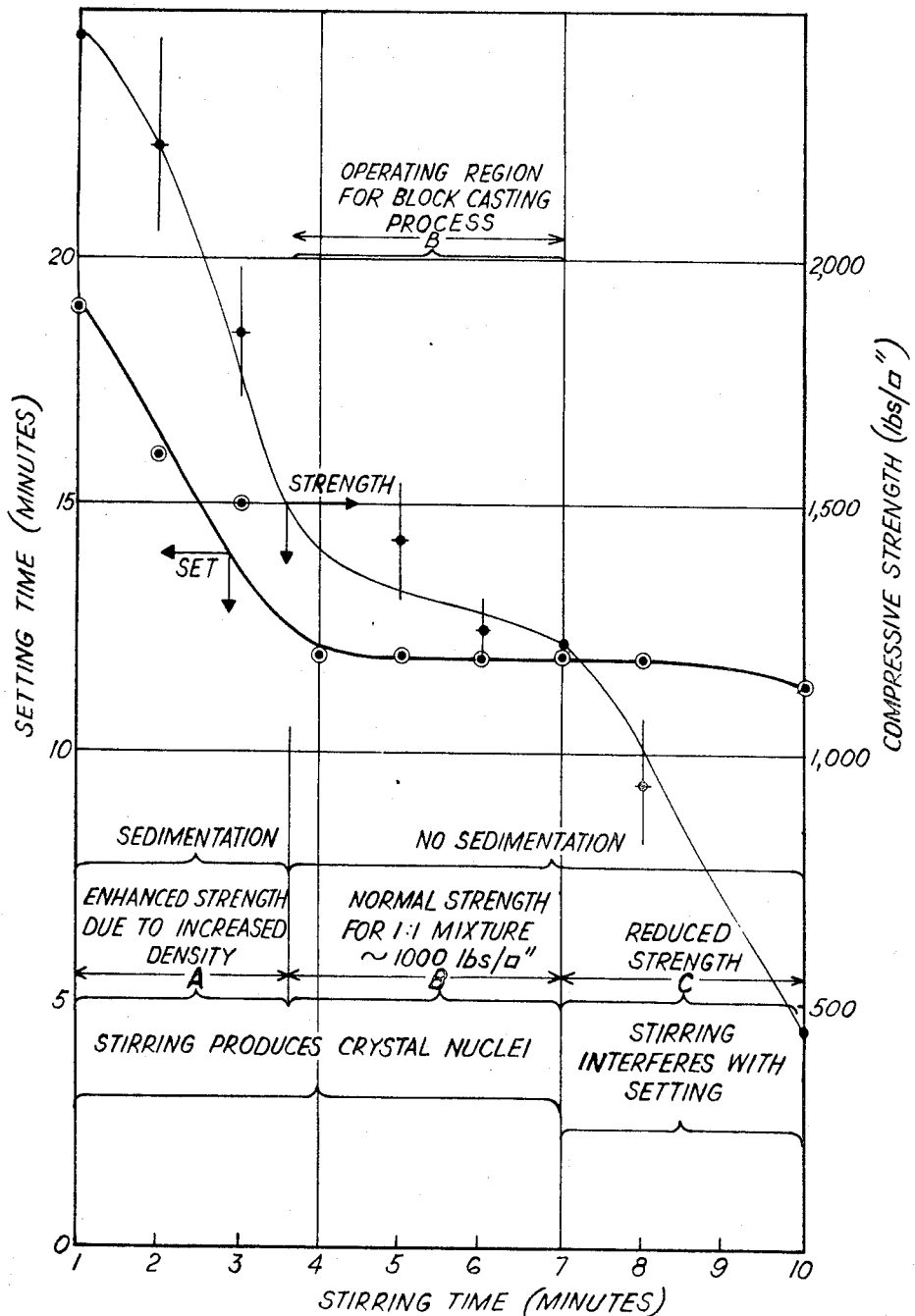

3,432,318
PREPARATION OF CALCIUM SULPHATE ALPHA-HEMIHYDRATE SLURRIES FOR CASTING IN MOULDS
Martin Granger Brown, Norton-on-Tees, England, assignor to Imperial Chemical Industries Limited, London, England, a corporation of Great Britain
Filed Oct. 4, 1965, Ser. No. 492,651
Claims priority, application Great Britain, Oct. 8, 1964, 41,105/64
U.S. Cl. 106—110                              6 Claims
Int. Cl. B28b 1/00; C04b 11/00

ABSTRACT OF THE DISCLOSURE

There is provided a method for the production of cast gypsum products wherein a slurry of calcium sulphate α-hemihydrate is prepared and allowed to hydrate while simultaneously stirring the slurry sufficiently vigorously to prevent substantial sedimentation during stirring and continuing the stirring for a sufficient time to prevent substantial sedimentation after the cessation of stirring but for an insufficient time to cause the compressive strength of the cast product to fall below 800 lbs./sq. in. Thereafter the slurry is introduced into a mold for molding the product. In order to obtain good setting time and high compressive strengths, the stirring must be for a period of time between 3½ and 8½ minutes, preferably between 3½ and 7 minutes.

This invention relates to the production of gypsum blocks, panels or the like from calcium sulphate α-hemihydrate slurries.

Casting of calcium sulphate α-hemihydrate requires a slurry which is capable of being readily handled and which sets without sedimenting in the mould, but consideration of these properties indicates that they are incompatible, in that low sedimentation implies high shear stress at low shear rate, whereas easy handling requires low shear stress at low shear rate. Hitherto it has been thought that this difficulty could be overcome only by producing calcium sulphate α-hemihydrate having a special crystal habit, but all attempts to modify its normal crystal habit so as to produce a slurry which fulfills these requirements have failed.

We have now discovered, however, how a readily-handled, rapidly-sedimenting α-hemihydrate slurry can be converted, at the required time, into a nonsedimenting, pourable mixture suitable for casting in moulds. We have observed that rapid sedimentation occurs when particles in suspension are sufficiently distant from one another to permit free fall, and there exists no "packing" effect. Small cuboid crystals of α-hemihydrate demonstrate such free fall, but dendritic growths of gypsum appear on the crystal surface upon setting. If this crystal growth, which is associated with hydration of the hemihydrate, is inhibited, then the slurry remains readily-handled but sediments rapidly. Conversely, if hydration is encouraged whilst stirring continues, dendritic growths appear, fragments are knocked off making new growth nuclei, and eventually neighbouring particles interlock with one another; in this condition no further sedimentation takes place before setting, and the slurry is suitable for moulding.

The present invention accordingly provides a method for the production of cast gypsum products, for example blocks, panels or the like, which consists in forming a readily-handled but rapidly-sedimenting slurry of calcium sulphate α-hemihydrate, causing or allowing the slurry to hydrate, simultaneously stirring the hydrating slurry sufficiently vigorously to prevent substantial sedimentation during stirring, continuing stirring for a sufficient length of time to prevent substantial sedimentation after the cessation of stirring but for an insufficient length of time to cause the compressive strength of the cast product to fall below an acceptable value, and thereupon introducing the slurry into a mould.

Preferably the stirring is stopped as soon as possible after said sufficient length of time.

The invention is particularly useful for the production of gypsum blocks or panels for partitioning purposes, for which the minimum acceptable compressive strength is about 800 lbs./sq. inch, and stirring is therefore preferably continued for an insufficient length of time to cause the compressive strength of the cast product to fall below this value.

In a preferred embodiment, the invention provides a method for the production of cast gypsum products, for example blocks, panels or the like, which consists in forming a slurry of calcium sulphate α-hemihydrate having a water-ratio in the range 0.8 to 1.1, preferably in the range 0.85 to 1.05, causing or allowing the slurry to hydrate, simultaneously stirring the hydrating slurry sufficiently vigorously to prevent substantial sedimentation during stirring, continuing stirring for between 3½ and 8½ minutes, preferably for between 3½ and 7 minutes, and thereupon introducing the slurry into a mould.

EXAMPLE

A neutralised, rapidly-sedimenting autoclave calcium sulphate α-hemihydrate, obtained by the process described and claimed in our copending British patent application No. 47,675/63, was selected for trial, of which the setting time, without acid addition, was in excess of 30 minutes.

The calcium sulphate α-hemihydrate was mixed into a slurry with an equal quantity of $N/40$ $H_2SO_4$ solution in order to produce a casting with a final density of about 60 lbs./cu. ft. (This quantity of acid was not fundamental but was due in part to alkalinity of the hemihydrate as a result of earlier lime addition.) A pH in the region of about 2 was produced.

The slurry was mixed by propeller stirrer for various predetermined periods and then cast into half-inch cube moulds. When the initial set had occurred, surplus material was removed from the top of the moulds, and the half-inch cubes were placed in a humid atmosphere for 24 hours before drying and crushing. It was observed that corresponding to the small stirring times of less than about 3½ or 4 minutes there was sedimentation of the material in the moulds, so that as the moulds were over-filled, the surplus solid on top sedimented into the cubes below, and the resulting cubes were of a greater density than normal. This effect lasted until a stirring time of about 3½ or 4 minutes was reached.

After allowing 24 hours for complete hydration the cubes were dried in an oven at 35° C. and then crushed. The mean and standard deviation of the crushing strengths is plotted against the stirring times on the graph shown in the accompanying drawing.

An experiment to determine the setting time of the plaster by the B.S.S. vicat test was conducted simultaneously with the cube casting, these results being plotted against the stirring time on the same graph as the crushing strength.

Cube strength.—It will be seen that the graph can be divided into three regions A, B and C, in the first of which, A, strength falls rapidly, and in the second of which, B, it remains fairly constant, and in the third of which, C, it falls once again. In the first region A, strength is anomalously high owing to sedimentation increasing the cube density. In the second and third regions, B and C, sedimentation has been eliminated by stirring during hydration, but whereas in the second region B the strength remains constant at a level somewhat higher than 1000 lbs./sq. in. which is considered normal for 1:1 mixtures, in the third region C it falls off rapidly as the crystal bridges forming the solid matrix are disturbed by prolonged stirring. Strength, therefore, is not adversely affected by a period of stirring which is just sufficient to inhibit sedimentation.

*Setting time.*—Stirring of hydrating calcium sulphate α-hemihydrate crystals produces crystal nuclei by means of fragmentation of the dihydrate dendrites. The setting time is reduced to a constant rate corresponding fairly exactly with the end of sedimentation and thereafter very little alteration in the setting time is observed.

The second, stable, region B (stirring time 3½ to 7 minutes) of the strength and setting time curves corresponds to a useful flexible operating zone where strength remains fairly constant at a fairly high level, above about 1200 lbs./sq. inch, and where the setting time is at a near minimium, and we accordingly prefer to stir the α-hemihydrate slurry for just sufficient time to enable it to be poured and set within the limits of said zone, that is to say for about 3½ to 7 minutes. It will be seen that the most suitable compromise between low setting time and high compressive strength is obtained with a stirring time of about 4 to 5 minutes.

The minimum acceptable compressive strength for gypsum blocks or panels for partitioning purposes is about 800 lbs./sq. inch, corresponding to a stirring time of about 8½ minutes. This is acceptable, but beyond about 8½ minutes, the compressive strength of the cast products falls away too rapidly for practical purposes.

I claim:

1. A method for the production of cast gypsum products, which consists in forming a readily-handled but rapidly-sedimenting slurry of calcium sulphate α-hemihydrate, allowing the slurry to hydrate, simultaneously stirring the hydrating slurry sufficiently vigorously to prevent substantial sedimentation during stirring, continuing stirring for a sufficient length of time to prevent substantial sedimentation after the cessation of stirring but for an insufficient length of time to cause the compressive strength of the cast product to fall below 800 lbs./sq. inch, and thereupon introducing the slurry into a mould.

2. A method for the production of cast gypsum products, which consists in forming a slurry of calcium sulphate α-hemihydrate having a water-ratio in the range 0.8 to 1.1, allowing the slurry to hydrate, simultaneously stirring the hydrating slurry sufficiently vigorously to prevent substantial sedimentation during stirring, continuing stirring for between 3½ and 8½ minutes, and thereupon introducing the slurry into a mould.

3. A method as claimed in claim 2, wherein the water-ratio is in the range 0.85 to 1.05.

4. A method as claimed in claim 2, wherein the water-ratio is about 1.

5. A method as claimed in claim 2, wherein stirring is continued for between 3½ and 7 minutes.

6. A method as claimed in claim 2, wherein stirring is continued for between 4 and 5 minutes.

References Cited

UNITED STATES PATENTS 1,909,465   5/1933   Hansen et al. _____ 106—110

JAMES E. POER, *Primary Examiner.*